United States Patent
Araki

(10) Patent No.: US 9,007,323 B2
(45) Date of Patent: Apr. 14, 2015

(54) HAPTIC FEEDBACK DEVICE, METHOD FOR DRIVING HAPTIC FEEDBACK DEVICE, AND DRIVE PROGRAM

(71) Applicant: Panasonic Intellectual Property Management Co., Ltd., Osaka (JP)

(72) Inventor: Shoichi Araki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/009,200

(22) PCT Filed: Jan. 28, 2013

(86) PCT No.: PCT/JP2013/000409
§ 371 (c)(1),
(2) Date: Oct. 1, 2013

(87) PCT Pub. No.: WO2013/114844
PCT Pub. Date: Aug. 8, 2013

(65) Prior Publication Data
US 2014/0078102 A1 Mar. 20, 2014

(30) Foreign Application Priority Data
Feb. 3, 2012 (JP) .................................. 2012-021925

(51) Int. Cl.
*G06F 3/041* (2006.01)
*G06F 3/01* (2006.01)
(Continued)

(52) U.S. Cl.
CPC .............. *G06F 3/0414* (2013.01); *G06F 3/016* (2013.01); *G06F 3/04815* (2013.01); *G06F 3/04845* (2013.01); *G06T 19/00* (2013.01); *G06F 3/04883* (2013.01); *G06F 2203/014* (2013.01)

(58) Field of Classification Search
CPC ....... G06F 3/044; G06F 3/045; G06F 3/0412; G06F 3/0416; G06F 3/046
USPC ......... 345/173–178; 178/18.01–18.09, 18.11; 463/30; 340/4.12, 407.1, 407.2; 715/702
See application file for complete search history.

(56) References Cited

U.S. PATENT DOCUMENTS 7,614,008 B2 11/2009 Ording
7,653,883 B2 1/2010 Hotelling et al.
(Continued)

FOREIGN PATENT DOCUMENTS

JP 9-6526 1/1997
JP 2006-122285 5/2006
(Continued)

OTHER PUBLICATIONS
International Search Report issued Mar. 12, 2013 in corresponding International Application No. PCT/JP2013/000409.

*Primary Examiner* — Shaheda Abdin
(74) *Attorney, Agent, or Firm* — Wenderoth, Lind & Ponack, L.L.P.

(57) ABSTRACT

A haptic feedback device includes: a determination unit which calculates, as a path length, a length along which a user touches the touch panel; a display control unit which converts the path length into a rotation angle of a manipulation image, and display the rotated manipulation image on a display unit; and a vibration control unit which drives a vibration unit according to a drive waveform having a predetermined amplitude and a predetermined frequency upon starting rotation of the manipulation image, decreases the amplitude of the drive waveform with an increase in the path length, and performs control to cause the vibration unit to vibrate according to the drive waveform the amplitude of which is decreased to zero in a predetermined time after the rotation of the manipulation image stops.

8 Claims, 8 Drawing Sheets

(51) Int. Cl.
  *G06F 3/0481* (2013.01)
  *G06F 3/0484* (2013.01)
  *G06T 19/00* (2011.01)
  *G06F 3/0488* (2013.01)

(56) References Cited

U.S. PATENT DOCUMENTS

| | | |
|---|---|---|
| 7,760,187 B2 | 7/2010 | Kennedy |
| 7,844,914 B2 | 11/2010 | Andre et al. |
| 7,900,156 B2 | 3/2011 | Andre et al. |
| 8,232,969 B2 | 7/2012 | Grant et al. |
| 8,239,784 B2 | 8/2012 | Hotelling et al. |
| 8,264,465 B2 | 9/2012 | Grant et al. |
| 8,381,135 B2 | 2/2013 | Hotelling et al. |
| 8,427,445 B2 | 4/2013 | Kennedy |
| 8,479,122 B2 | 7/2013 | Hotelling et al. |
| 2003/0080987 A1* | 5/2003 | Rosenberg .................. 345/701 |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0053387 A1 | 3/2006 | Ording |
| 2006/0085757 A1 | 4/2006 | Andre et al. |
| 2006/0109256 A1 | 5/2006 | Grant et al. |
| 2006/0119586 A1 | 6/2006 | Grant et al. |
| 2006/0161870 A1 | 7/2006 | Hotelling et al. |
| 2006/0161871 A1 | 7/2006 | Hotelling et al. |
| 2007/0171210 A1 | 7/2007 | Chaudhri et al. |
| 2007/0174788 A1 | 7/2007 | Ording |
| 2007/0247442 A1 | 10/2007 | Andre et al. |
| 2008/0204426 A1 | 8/2008 | Hotelling et al. |
| 2008/0211775 A1 | 9/2008 | Hotelling et al. |
| 2008/0211783 A1 | 9/2008 | Hotelling et al. |
| 2008/0211784 A1 | 9/2008 | Hotelling et al. |
| 2008/0211785 A1 | 9/2008 | Hotelling et al. |
| 2008/0231610 A1 | 9/2008 | Hotelling et al. |
| 2010/0141606 A1* | 6/2010 | Bae et al. ....................... 345/174 |
| 2010/0259500 A1 | 10/2010 | Kennedy |
| 2012/0293440 A1 | 11/2012 | Hotelling et al. |
| 2012/0299857 A1 | 11/2012 | Grant et al. |
| 2013/0154982 A1 | 6/2013 | Hotelling et al. |

FOREIGN PATENT DOCUMENTS

| | | |
|---|---|---|
| JP | 4473078 | 6/2010 |
| JP | 2011-054196 | 3/2011 |
| JP | 2011-145953 | 7/2011 |
| JP | 2011-159110 | 8/2011 |
| JP | 4763695 | 8/2011 |
| WO | 2006/020304 | 2/2006 |

* cited by examiner

FIG. 1
(a) 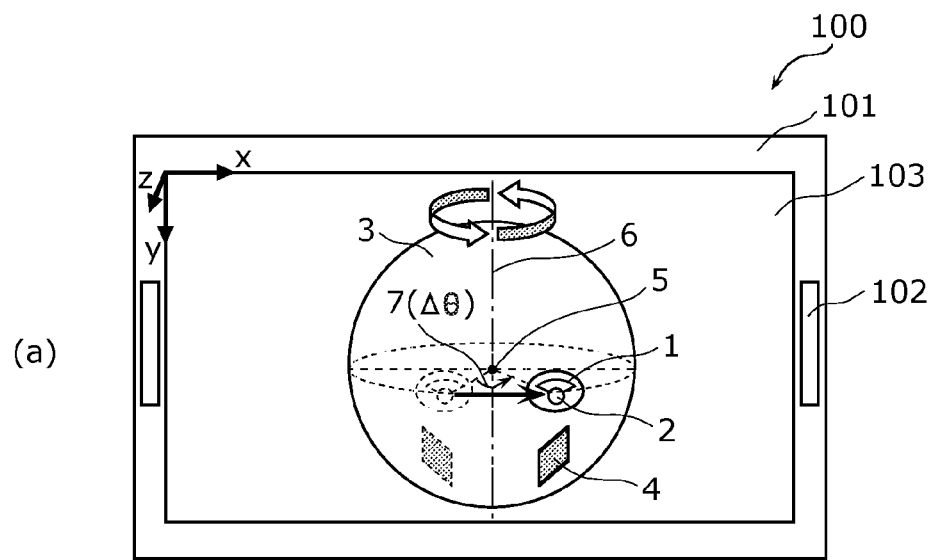
(b) 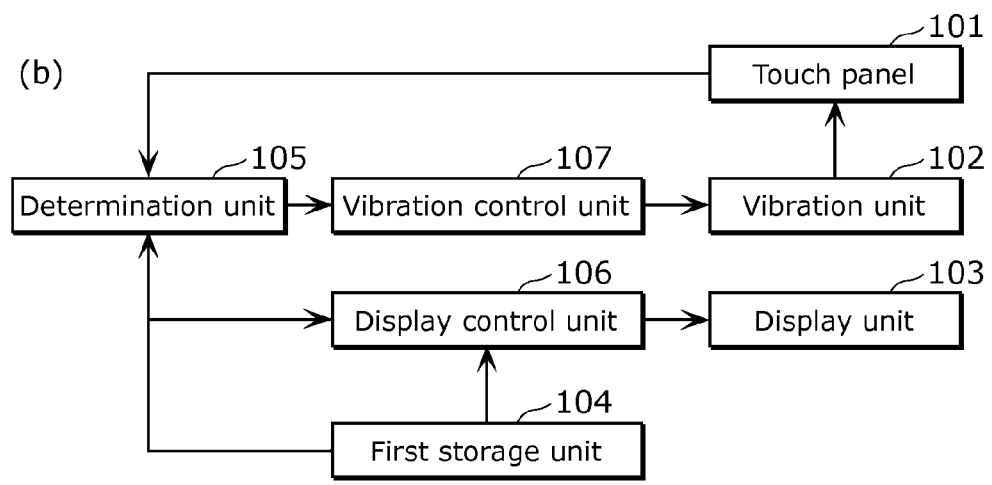

FIG. 4

| Determination unit | $P_{t-1}$ | $P_t$ | $|v_{t-1}|$ | $|v_t|$ | Vibration control unit | Display control unit |
|---|---|---|---|---|---|---|
| Manipulation state [1] | Inside area | Inside area | — | $0 \leq |v_t|$ | First waveform (amplitude decreases over $d_t$) | Rotate $\Delta\theta$ |
| Manipulation state [2] | Inside area | Outside area | — | — | Second waveform | Rotate at $|v_t|$ |
| Manipulation state [3] | Inside area | Not detected | $0 \leq |v_{t-1}|$ | — | Cause no vibration | Rotate at $|v_{t-1}|$ |
| Manipulation state [4] | Outside area | Inside area | — | $0 \leq |v_t|$ | First waveform (amplitude decreases over $d_t$) | Rotate $\Delta\theta$ |
| Manipulation state [5] | Outside area | Outside area | — | — | Cause no vibration | Not update |
| Manipulation state [6] | Outside area | Not detected | — | — | Cause no vibration | Not update |
| Manipulation state [7] | Not detected | Inside area | — | — | Third waveform (only during rotation) | Stop rotation |
| Manipulation state [8] | Not detected | Outside area | — | — | Cause no vibration | Not update |
| Manipulation state [9] | Not detected | Not detected | — | — | Cause no vibration | Not update |

HAPTIC FEEDBACK DEVICE, METHOD FOR DRIVING HAPTIC FEEDBACK DEVICE, AND DRIVE PROGRAM

TECHNICAL FIELD

The present invention relates to a technique of informing, by haptic feedback, a user of a manipulation state when the user manipulates a virtual object displayed on a touch panel display with his/her finger or a pen, and in particular to a haptic feedback device and a haptic feedback method for informing, by haptic feedback, a user of a manipulation state when the user performs a manipulation of rotating a virtual object.

BACKGROUND ART

In recent years, touch panels have been widely used as manipulation interfaces of smart phones, tablet terminals, personal computers, game machines, and others. Such a device detects, as a touch position, a position on the touch panel at which a user makes a touch, and allows the user to manipulate a virtual object such as a graphical user interface (GUI) displayed at the touch position. In general, touch panels, unlike mechanical switches, do not provide a user with a sense of touch when the user manipulates a virtual object (a manipulation sensation through haptic feedback), and thus a haptic feedback device is disclosed which allows a user to certainly recognize the state of a virtual object or a manipulation state by vibrating the touch panel when the user manipulates the virtual object.

CITATION LIST

Patent Literature

[PTL 1] Japanese Patent No. 4473078
[PTL 2] Japanese Unexamined Patent Application Publication No. 2011-159110
[PTL 3] Japanese Patent No. 4763695

SUMMARY OF INVENTION

Technical Problem

However, a problem is that the above devices cannot appropriately convey to a user, by providing the user with a manipulation sensation through haptic feedback, a manipulation state when the user performs a touch manipulation on a three-dimensional virtual object.

The present invention has been conceived in view of the above conventional problems, and an object thereof is to provide a haptic feedback device and a haptic feedback method which can provide a user with a manipulation sensation by haptic feedback to convey a state of a three-dimensional model of a manipulation image being rotated when the user performs a manipulation of rotating the manipulation image displayed on the display unit, by making a touch along a touch panel.

Solution to Problem

In order to solve the above conventional problems, a haptic feedback device according to an aspect of the present invention is a haptic feedback device for informing, when a user performs a touch manipulation on a three-dimensional model of a manipulation image displayed on a display unit, the user of a manipulation state of the touch manipulation, the haptic feedback device including: a touch panel which receives a touch manipulation performed by the user at a corresponding position on a display surface of the display unit, and detects, as a touch position, the corresponding position at which the touch manipulation is received; a vibration unit configured to vibrate the touch panel; the display unit; a first storage unit configured to store display data indicating the manipulation image; a determination unit configured to (i) obtain a plurality of the touch positions detected by the touch panel at different times, and (ii) determine the manipulation state, based on the plurality of obtained touch positions; a display control unit configured (i) to display the manipulation image on the display unit, and (ii) to make or not to make a change for rotating the manipulation image displayed on the display unit, depending on the manipulation state determined by the determination unit; and a vibration control unit configured to cause the vibration unit to vibrate based on the manipulation state determined by the determination unit, wherein the determination unit is configured to (i) determine that the manipulation state of a touch manipulation is a first manipulation state when a touch position detected by the touch panel during the touch manipulation on the manipulation image shifts within an area of the display unit in which the manipulation image is displayed, and (ii) determine that the manipulation state of a touch manipulation is a second manipulation state when a touch position detected by the touch panel during the touch manipulation on the manipulation image shifts out of the area of the display unit in which the manipulation image is displayed, when the determination unit determines that the manipulation state is the first manipulation state, the vibration control unit is configured to decrease an amplitude of a first drive waveform for vibrating the vibration unit with an increase in a length of a shift of the touch position, which corresponds to the change from a start to a stop, and perform control to cause the vibration unit to vibrate according to the first drive waveform the amplitude of which is decreased to zero in a predetermined time after the change stops, and when the determination unit determines that the manipulation state is the second manipulation state, the vibration control unit is configured to cause the vibration unit to vibrate according to a second drive waveform after the touch position has shifted out of the area in which the manipulation image is displayed, and when the determination unit determines that the manipulation state is the first manipulation state, the display control unit is configured to make the change to the manipulation image displayed on the display unit, based on a difference between two of the plurality of touch positions, and when the determination unit determines that the manipulation state is the second manipulation state, the display control unit is configured to make the change to the manipulation image displayed on the display unit, based on a velocity calculated from the plurality of touch positions obtained along the shift from inside to outside of the area in which the manipulation image is displayed.

It should be noted that these general and specific aspects may be implemented using a system, a method, an integrated circuit, a computer program, a computer-readable recording medium such as a CD-ROM, or any combination of systems, methods, integrated circuits, computer programs and recording media.

Advantageous Effects of Invention

A haptic feedback device and a haptic feedback method according to the present invention can convey a manipulation sensation to a user when the user performs a manipulation of rotating a manipulation image (for example, a GUI represented as a sphere) displayed on a display unit, by making a touch along a touch panel.

BRIEF DESCRIPTION OF DRAWINGS

FIG. 1 is a configuration diagram of a haptic feedback device according to Embodiment 1 of the present invention.

FIG. 4 illustrates an operational relationship between a manipulation state determination unit, a vibration control unit, and a display control unit according to Embodiment 1 of the present invention.

Figure 2:
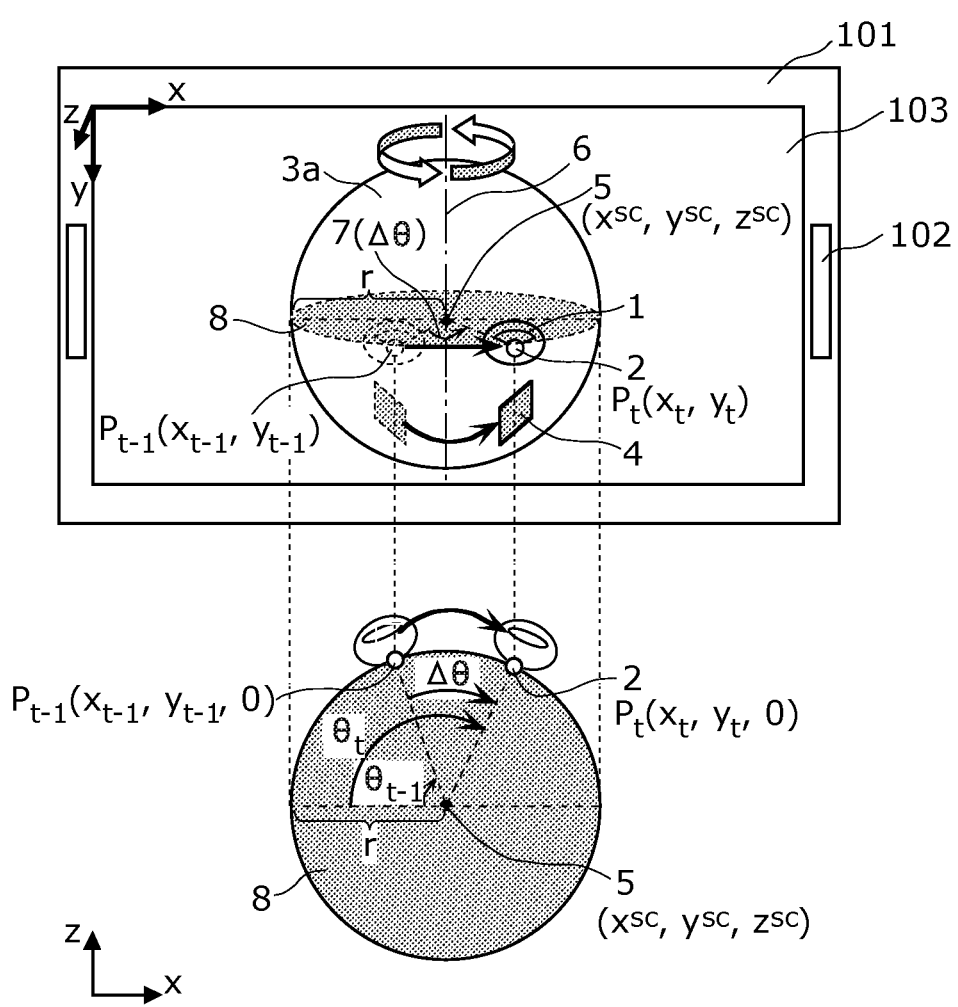
FIG. 2 illustrates a method for controlling the display of a virtual trackball according to Embodiment 1 of the present invention.

DESCRIPTION OF EMBODIMENTS (Underlying Knowledge Forming Basis of the Present Invention)

The inventors of the present invention have found that a haptic feedback device described in the "Background Art" section has the following problems.

PTL 1 discloses that a user is provided with a click sensation through the vibration of a touch panel according to a waveform indicating a temporal change in a key pressing force, for the purpose of conveying a manipulation state to the user when the user presses a key of a keyboard.

PTL 2 discloses a technique of allowing a user to sense a change in mass or viscosity by changing the amplitude of vibration in proportion to the acceleration or velocity of a virtual object when the user manipulates the virtual object, for the purpose of conveying the state of the virtual object to the user when the user performs a drag manipulation on the virtual object.

PTL 3 discloses that for the purpose of conveying the amount of manipulating a virtual knob for setting volume or the like or a virtual scroll wheel for handling a list or the like, a touch panel is vibrated each time a rotation gesture, that is, moving a finger to draw a circle on the touch panel, causes rotation of the knob or wheel by a unit amount (for example, every five degrees).

PTLs 1 to 3 disclose feedback methods for conveying, to a user, a state of manipulating a two-dimensional GUI by haptic feedback, such as a click sensation when the user presses a virtual key, a change in mass or viscosity when the user drags an icon, vibration notification for a unit amount of rotation when the user manipulates a virtual scroll wheel, based on rotation gesture recognition on a flat surface of a touch panel, and the like.

These conventional techniques, however, are not achieved taking into consideration conveying a manipulation sensation by haptic feedback in response to a manipulation of rotating a three-dimensional virtual object. Specifically, such conventional techniques have problems that even if a trackball function of moving a cursor or the like by rotating a sphere with a finger of a user is to be virtually achieved as a GUI that can be manipulated using a touch panel, a manipulation sensation for conveying, to the user, a state of rotating the virtual sphere displayed on the display cannot be provided to the user by haptic feedback.

In order to solve such a problem, a haptic feedback device according to an aspect of the present invention is a haptic feedback device for informing, when a user performs a touch manipulation on a three-dimensional model of a manipulation image displayed on a display unit, the user of a manipulation state of the touch manipulation, the haptic feedback device including: a touch panel which receives a touch manipulation performed by the user at a corresponding position on a display surface of the display unit, and detects, as a touch position, the corresponding position at which the touch manipulation is received; a vibration unit configured to vibrate the touch panel; the display unit; a determination unit configured to calculate a path length along which the user touches the touch panel, based on a plurality of the touch positions detected by the touch panel; a display control unit configured to (i) display the manipulation image on the display unit, and (ii) convert the path length into a rotation angle at which the manipulation image is to be rotated about a predetermined reference point, and display, on the display unit, the manipulation image rotated by the rotation angle converted from the path length; and a vibration control unit configured to (i) drive, upon starting rotation of the manipulation image, the vibration unit according to a drive waveform having a predetermined amplitude and a predetermined frequency, (ii) decrease the amplitude of the drive waveform with an increase in the path length, and (iii) perform control to cause the vibration unit to vibrate according to the drive waveform the amplitude of which is decreased to zero in a predetermined time after the rotation of the manipulation image stops.

This configuration can provide the user with a manipulation sensation by haptic feedback when the user performs a manipulation of rotating the three-dimensional virtual object.

Furthermore, a haptic feedback device according to an aspect of the present invention is a haptic feedback device for informing, when a user performs a touch manipulation on a three-dimensional model of a manipulation image displayed on a display unit, the user of a manipulation state of the touch manipulation, the haptic feedback device including: a touch panel which receives a touch manipulation performed by the user at a corresponding position on a display surface of the display unit, and detects, as a touch position, the corresponding position at which the touch manipulation is received; a vibration unit configured to vibrate the touch panel; the display unit; a first storage unit configured to store display data indicating the manipulation image; a determination unit configured to (i) obtain a plurality of the touch positions detected by the touch panel at different times, and (ii) determine the manipulation state, based on the plurality of obtained touch positions; a display control unit configured (i) to display the manipulation image on the display unit, and (ii) to make or not to make a change for rotating the manipulation image displayed on the display unit, depending on the manipulation state determined by the determination unit; and a vibration control unit configured to cause the vibration unit to vibrate based on the manipulation state determined by the determination unit, wherein the determination unit is configured to (i) determine that the manipulation state of a touch manipulation is a first manipulation state when a touch position detected by the touch panel during the touch manipulation on the manipulation image shifts within an area of the display unit in which the manipulation image is displayed, and (ii) determine that the manipulation state of a touch manipulation is a second manipulation state when a touch position detected by the touch panel during the touch manipulation on the manipulation image shifts out of the area of the display unit in which the manipulation image is displayed, when the determination unit determines that the manipulation state is the first manipulation state, the vibration control unit is configured to decrease an amplitude of a first drive waveform for vibrating the vibration unit with an increase in a length of a shift of the touch position, which corresponds to the change from a start to a stop, and perform control to cause the vibration unit to vibrate according to the first drive waveform the amplitude of which is decreased to zero in a predetermined time after the change stops, and when the determination unit determines that the manipulation state is the second manipulation state, the vibration control unit is configured to cause the vibration unit to vibrate according to a second drive waveform after the touch position has shifted out of the area in which the manipulation image is displayed, and when the determination unit determines that the manipulation state is the first manipulation state, the display control unit is configured to make the change to the manipulation image displayed on the display unit, based on a difference between two of the plurality of touch positions, and when the determination unit determines that the manipulation state is the second manipulation state, the display control unit is configured to make the change to the manipulation image displayed on the display unit, based on a velocity calculated from the plurality of touch positions obtained along the shift from inside to outside of the area in which the manipulation image is displayed.

When a user performs a manipulation of rotating, as a virtual trackball, a GUI represented as a sphere displayed on the display unit by making a touch along the touch panel, this configuration allows making a determination as to whether the state is a manipulation state in which the virtual trackball is being rotated with the user's finger thereon or a manipulation state in which the user moves his/her finger off the virtual trackball to let the trackball keep rotating when the trackball is being rotated, and conveying a manipulation sensation to the user by haptic feedback.

Furthermore, a haptic feedback device according to an aspect of the present invention is a haptic feedback device for informing, when a user performs a touch manipulation on a three-dimensional model of a manipulation image displayed on a display unit, the user of a manipulation state of the touch manipulation, the haptic feedback device including: a touch panel which receives a touch manipulation performed by the user at a corresponding position on a display surface of the display unit, and detects, as a touch position, the corresponding position at which the touch manipulation is received; a vibration unit configured to vibrate the touch panel; the display unit; a determination unit configured to (i) determine that the manipulation state of a touch manipulation is a first manipulation state when a touch position detected by the touch panel during the touch manipulation on the manipulation image shifts within an area of the display unit in which the manipulation image is displayed, and (ii) determine that the manipulation state of a touch manipulation is a second manipulation state when a touch position detected by the touch panel during the touch manipulation on the manipulation image shifts out of the area of the display unit in which the manipulation image is displayed; a display control unit configured to (i) display the manipulation image to be manipulated by the touch manipulation, on part of the display unit, and (ii) rotate the manipulation image, based on a length between two of a plurality of the touch positions and a direction defined by the two touch positions, and display the rotated manipulation image; and a vibration control unit configured to control vibration of the vibration unit to vibrate the touch panel according to drive waveforms having different amplitudes and different frequencies, according to the first manipulation state and the second manipulation state.

For example, when the determination unit determines that the manipulation state is the first manipulation state, the vibration control unit may be configured to decrease an amplitude of a first drive waveform for vibrating the vibration unit with an increase in a length of a shift in the touch position detected during the touch manipulation the manipulation state of which is determined to be the first manipulation state, and perform control to cause the vibration unit to vibrate according to the first drive waveform the amplitude of which is decreased to zero at a position where the touch manipulation ends, and when the determination unit determines that the manipulation state is the second manipulation state, the vibration control unit may be configured to cause the vibration unit to vibrate according to a second drive waveform after the touch position has shifted out of the area in which the manipulation image is displayed, and when the determination unit determines that the manipulation state is the first manipulation state, the display control unit may be configured to make the change to the manipulation image displayed on the display unit, based on a difference between two of the plurality of touch positions, and when the determination unit determines that the manipulation state is the second manipulation state, the display control unit may be configured to make the change to the manipulation image displayed on the display unit, based on a velocity calculated from the plurality of touch positions obtained along the shift from inside to outside of the area in which the manipulation image is displayed.

Furthermore, a haptic feedback device according to an aspect of the present invention is a haptic feedback device for informing, when a user performs a touch manipulation on a three-dimensional model of a manipulation image displayed on a display unit, the user of a manipulation state of the touch manipulation, the haptic feedback device including: a touch panel which receives a touch manipulation performed by the user at a corresponding position on a display surface of the display unit, and detects, as a touch position, the corresponding position at which the touch manipulation is received; the display unit; a display control unit configured to (i) display the manipulation image on the display unit, and (ii) display the manipulation image rotated based on a length between two of a plurality of the touch positions detected by the touch panel and a direction defined by the two touch positions; a vibration unit configured to vibrate the touch panel; a determination unit configured to calculate a path length along which the user touches the touch-panel, based on chronological information of the plurality of touch positions; and a vibration control unit configured to (i) drive the vibration unit according to a drive waveform having a predetermined amplitude and a predetermined frequency at a touch start point in the touch manipulation on the manipulation image, (ii) decrease the amplitude of the drive waveform with an increase in the path length, and (iii) perform control to cause the vibration unit to vibrate according to the drive waveform the amplitude of which is decreased to zero when a predetermined time elapses after the user touches a touch end point of the plurality of touch positions at which the touch manipulation is performed on the manipulation image.

Furthermore, a haptic feedback device according to an aspect of the present invention is a haptic feedback device for informing, when a user performs a touch manipulation on a three-dimensional model of a manipulation image displayed on a display unit, the user of a manipulation state of the touch manipulation, the haptic feedback device including: a touch panel which receives a touch manipulation performed by the user at a corresponding position on a display surface of the display unit, and detects, as a touch position, the corresponding position at which the touch manipulation is received; the display unit; a display control unit configured to (i) display the manipulation image on the display unit, and (ii) display the manipulation image rotated based on a length between two of a plurality of the touch positions and a direction defined by the two touch positions; a vibration unit configured to vibrate the touch panel; a determination unit configured to calculate a path length along which the user touches the touch-panel, based on chronological information of the plurality of touch positions; and a vibration control unit configured to perform vibration control to repeatedly drive the vibration unit according to a drive waveform having a predetermined amplitude and a predetermined frequency and stop driving the vibration unit, from when the user starts the touch manipulation on the manipulation image at a touch start point through when the user ends the touch manipulation at a touch end point.

It should be noted that these general and specific aspects may be implemented using a system, a method, an integrated circuit, a computer program, a computer-readable recording medium such as a CD-ROM, or any combination of systems, methods, integrated circuits, computer programs, and recording media.

The following is a description of embodiments of the present invention, with reference to drawings.

Embodiment 1

A haptic feedback device according to Embodiment 1 informs, by providing a manipulation sensation through haptic feedback, a user of a manipulation state when the user performs a manipulation of rotating a spherical manipulation image (virtual trackball) serving as a GUI. In other words, when a user performs a touch manipulation on a manipulation image displayed on the display unit as a target for a touch manipulation, the haptic feedback device informs the user of a manipulation state of the touch manipulation.

There are mainly two types of manipulations for manipulating an actual trackball, namely, a first manipulation for moving a cursor or the like by the amount of the ball being rotated while a finger keeps touching the ball and a second manipulation for continuously moving a cursor or the like while the ball continues rotating by a user rotating the ball vigorously and then moving his/her finger off the ball. The haptic feedback device according to Embodiment 1 informs, by providing a manipulation sensation through haptic feedback, the user of the states of the first manipulation and the second manipulation when the user manipulates the virtual trackball.

FIG. 1 illustrates a configuration of a haptic feedback device according to an embodiment of the present invention.

A haptic feedback device 100 according to the present embodiment includes a touch panel 101, a vibration unit 102, a display unit 103, a first storage unit 104, a determination unit 105, a display control unit 106, and a vibration control unit 107.

The touch panel 101 receives a touch manipulation performed by a user's finger 1 at a corresponding position on a display surface of the display unit 103, and detects, as a touch position 2, the corresponding position at which the touch manipulation is received. Examples to be used as the touch panel 101 include an electrical capacitance touch panel, a resistance film touch panel, and the like.

The vibration unit 102 conveys haptic feedback to the finger 1 of the user by vibrating the touch panel 101. The vibration unit 102 is fixed to the touch panel 101 with, for example, an adhesive or the like. Examples to be used as the vibration unit 102 include a piezoelectric element, a vibrating motor, a voice coil, an artificial muscle, and the like.

Examples of the display units 103 include a liquid crystal display, an organic EL display, and the like, which display images outputted by the display control unit 106 described below.

Regarding the positional relationship between the touch panel 101, the vibration unit 102, and the display unit 103 of the haptic feedback device 100 according to Embodiment 1, the touch panel 101 is disposed on the display surface of the display unit 103, and the vibration unit 102 is disposed on the periphery of the touch panel so as not to block the display of the display unit 103. However, the configuration is not limited to the above, and it is conceivable that the touch panel 101 and the display unit 103 are disposed at different position. For example, a configuration may be adopted in which a television serves as the display unit 103, the touch panel 101 is provided on a TV remote control, and a cursor is displayed on the television to show the detection result of a touch position.

The first storage unit 104 has stored therein display data indicating a manipulation image 3. If the manipulation image 3 is representing a sphere, the first storage unit 104 has preferably stored therein a three dimensional model of a sphere and texture information 4 to be mapped on the surface of the three dimensional model, as the display data indicating the stored manipulation image 3. If a user performs a touch manipulation of rotating the manipulation image 3, the display control unit 106 described below can change how light appears which is created using computer graphics on the manipulation image 3, by displaying the manipulation image 3 on the display unit 103 using the texture information 4. This allows the user to recognize that the manipulation image 3 displayed on the display unit 103 is rotating by the touch manipulation performed by the user.

The texture information 4 to be mapped on the surface of the sphere is a bitmapped image which has 8-bit RGB values, for example. If the image of the earth observed from the universe is stored as a bitmapped image in the first storage unit 104, the display control unit 106 can display a virtual globe as a GUI like a virtual trackball. Furthermore, as a display data, the direction in which a virtual trackball 3a rotates may be limited, and the first storage unit may store therein plural two-dimensional images to be projected on the display unit 103 when the three dimensional object model of the sphere is rotated by given predetermined angles each time, and the display control unit 106 may change the plural images stored in the first storage unit so as to display one of the images according to a shift of the touch position 2.

The determination unit 105 obtains touch positions detected by the touch panel 101 at plural different times. The determination unit 105 determines a manipulation state based on the obtained plural touch positions. The determination unit 105 determines whether the manipulation state at the time of rotating the manipulation image 3 is the first manipulation state or the second manipulation state, using a path, along which the user touches the touch panel 101, obtained from the plural touch positions 2 detected by the touch panel 101. Specifically, when a touch position detected by the touch panel 101 during a touch manipulation on the manipulation image 3 shifts within the area of the display unit 103 in which the manipulation image 3 is displayed (or in other words, when all the touch positions 2 are included in the area), the determination unit 105 determines that the manipulation state of that touch manipulation is the first manipulation state. Furthermore, a touch position detected by the touch panel 101 during a touch manipulation on the manipulation image 3 shifts out of the area of the display unit 103 in which the manipulation image 3 is displayed, the determination unit 105 determines that the manipulation state of the touch manipulation is the second manipulation state.

Specifically, the determination unit 105 obtains touch positions $P_t$ ($x_t$, $y_t$) at plural different times, or in other words, obtains a touch position $P_t$ ($x_t$, $y_t$) whenever a predetermined sampling time $\Delta t$ elapses, and stores the obtained touch positions $P_t$ ($x_t$, $y_t$) (at the plural times) into the second storage unit store in chronological order. The determination unit 105 determines the manipulation state according to whether the touch positions 2 at plural different positions are included in the area where the manipulation image 3 is displayed, by referring to area information of the manipulation image 3 on the touch panel 101 obtained from the first storage unit 104 and the touch positions 2 obtained from the second storage unit. Specifically, if all the plural touch positions 2 are included in the area where the manipulation image 3 is displayed, the determination unit 105 determines that the manipulation state of the touch manipulation during which the plural touch positions 2 are detected is the first manipulation state. Further, the determination unit determines that the manipulation state is the second manipulation state if the plural touch positions are distributed both inside and outside the area where the manipulation image 3 is displayed. Furthermore, the determination unit 105 may determine that the manipulation state is an undetected state in which no touch position 2 is detected.

It should be noted that if plural touch positions are not detected, the determination unit 105 does not need to determine the manipulation state of the touch manipulation. Such a case of not determining a manipulation state is not limited to when plural touch positions are located at exactly the same position, and may be when plural touch positions are included in a predetermined area (an area much smaller than the area where the manipulation image 3 is displayed).

The display control unit 106 displays the manipulation image 3 (virtual trackball) on the display unit 103. Further, the display control unit 106 makes or does not make a change to rotate the manipulation image being displayed on the display unit, depending on the manipulation state determined by the determination unit 105. Further, the display control unit 106 rotates the manipulation image, based on the length between two of plural touch positions detected by the touch panel and the direction defined thereby, and displays the resultant image on the display unit 103. Specifically, the display control unit 106 converts a path length into a rotation angle at which the manipulation image 3 is rotated about a predetermined reference point, and displays the manipulation image 3 rotated by the rotation angle converted from the path length, on the display unit 103.

Specifically, if the determination unit 105 determines that the manipulation state is the first manipulation state, the display control unit 106 makes a change to the manipulation image 3 displayed on the display unit 103, based on the difference between two of the touch positions 2. If the determination unit 105 determines that the manipulation state is the second manipulation state, the display control unit 106 makes a change to the manipulation image 3 displayed on the display unit 103, based on the velocity calculated from plural touch positions obtained along the shift from inside to outside of the area where the manipulation image 3 is displayed.

The display control unit 106 makes a change to the manipulation image 3 displayed on the display unit 103 by rotating the manipulation image 3 about a rotation axis 6 by a rotation angle 7 ($\Delta\theta$) calculated from the difference between two touch positions. It should be noted that the rotation axis 6 is a straight line passing through a sphere center 5 and orthogonal to a plane which includes three points, namely, two consecutive touch positions 2 and the sphere center 5.

To facilitate a description, a three-dimensional coordinate system (x, y, z) as illustrated in FIG. 1 is used, where the z axis is perpendicular to the sheet of paper, the viewer side is a positive side, and the display unit 103 is on an xy plane (z=0). In this case, as another way to make a change to the manipulation image 3 displayed on the display unit 103, as the rotation axis 6, a straight line may be adopted which passes through the sphere center 5 and is perpendicular to a plane which includes two consecutive touch positions 2, is perpendicular to the xy plane, and crosses the manipulation image 3 (sphere).

It should be noted that the display control unit 106 does not make a change to the manipulation image 3 displayed on the display unit 103 when the user performs no touch manipulation or when a touch position does not shift.

The vibration control unit 107 causes the vibration unit 102 to vibrate, based on the manipulation state determined by the determination unit 105. If the determination unit 105 determines that the manipulation state is the first manipulation state, the vibration control unit 107 decreases the amplitude of a first drive waveform for vibrating the vibration unit 102 with an increase in the length of shift of the touch position 2, which corresponds to the change from a start to a stop. The vibration control unit 107 controls the vibration unit 102 such that the amplitude of the drive waveform is decreased to zero in a predetermined time after the change stops.

It should be noted that in the present embodiment, the manipulation image 3 starts rotating at a touch position at which the user starts making a touch manipulation (touch start point (in time)), and the manipulation image 3 stops rotating at a touch position (touch end point (in time)) at which the touch manipulation ends. Further, the vibration control unit 107 causes the vibration unit 102 to vibrate according to a second drive waveform after the touch position 2 shifts out of the area where the manipulation image 3 is displayed, if the determination unit 105 determines that the manipulation state is the second manipulation state. In this way, the vibration control unit 107 controls vibration of the vibration unit 102 according to drive waveforms having different amplitudes and frequencies to vibrate the touch panel 101, according to the first manipulation state and the second manipulation state, thereby informing the user whether the manipulation state at that time is the first manipulation state or the second manipulation state.

As the drive waveform of the vibration unit 102, for example, a modulated wave which is a carrier wave obtained by modulating a sine wave is used, and a frequency of the carrier wave preferably ranges from 50 Hz to 500 Hz at which the user can feel a sensation.

A description is given of the operation of the haptic feedback device 100 according to Embodiment 1, based on FIGS. 2 to 7. Here, a description of the operation in Embodiment 1 is given using an example in which a manipulation of rotating the spherical manipulation image 3 as illustrated in FIG. 2 (hereinafter, referred to as the virtual trackball 3a) is performed.

To facilitate a description, a three-dimensional coordinate system (x, y, z) as illustrated in FIG. 2 is used, where the z axis is perpendicular to the sheet of paper, the viewer side is a positive side, and the display surface of the display unit 103 is on the xy plane (z=0). It should be noted that the display surface of the display unit 103 and the surface of the touch panel 101 are the same surface. Points on the xy plane are denoted by (x, y) coordinates. In FIG. 2, a three dimensional object model of the sphere can be represented by Expression 1, assuming that r denotes the radius of the sphere, and ($x^{sc}$, $y^{sc}$, $z^{sc}$) represents the sphere center 5.

[Math 1]

$$(x-x^{sc})^2+(y-y^{sc})^2+(z-z^{sc})^2=r^2 \quad \text{Expression 1}$$

Assume a case where as illustrated in FIG. 2, the user makes a touch with his/her finger 1 along the touch panel in an area in which the virtual trackball 3a represented by Expression 1 is displayed on the display unit 103, to perform a manipulation of rotating the virtual trackball 3a (hereinafter, referred to as "path touching manipulation").

Here, a description is given using an example in which the shift of the touch position 2 on the xy plane caused by a path touching manipulation is converted into the rotation angle of the spherical three-dimensional model represented by Expression 1, to rotate the virtual trackball 3a.

Specifically, the rotation axis 6 is a straight line passing through the sphere center 5 and perpendicular to a rotational plane 8 which includes two touch positions 2, namely, a touch position $P_t$ ($x_t$, $y_t$) obtained at time t and a touch position $P_{t-1}$ ($x_{t-1}$, $y_{t-1}$) obtained at time (t−Δt) and at which a plane perpendicular to the xy plane crosses the manipulation image 3. The virtual trackball 3a is rotated about the rotation axis 6 by the rotation angle 7 (Δθ=θ$_t$−θ$_{t-1}$) based on the difference between two of the touch positions 2. It should be noted that the angle θ$_t$ is an angle formed by a straight line passing through the sphere center 5 and the touch position $P_t$ ($x_t$, $y_t$) obtained at time t and a straight line (reference line) perpendicular to the rotation axis 6 and passing through the sphere center. Further, the angle θ$_{t-1}$ is an angle formed by the reference line and a straight line passing through the sphere center 5 and the touch position $P_{t-1}$ $y_{t-1}$) obtained at time (t−Δt).

Although the example in FIG. 2 illustrates the case where the user touches along the diameter of the virtual trackball 3a, and the radius of the rotational plane 8 is equal to the sphere radius, the user can rotate the virtual trackball 3a in an arbitrary direction in which the user performs a path touching manipulation within the area where the virtual trackball 3a is displayed, similarly.

Figure 3:
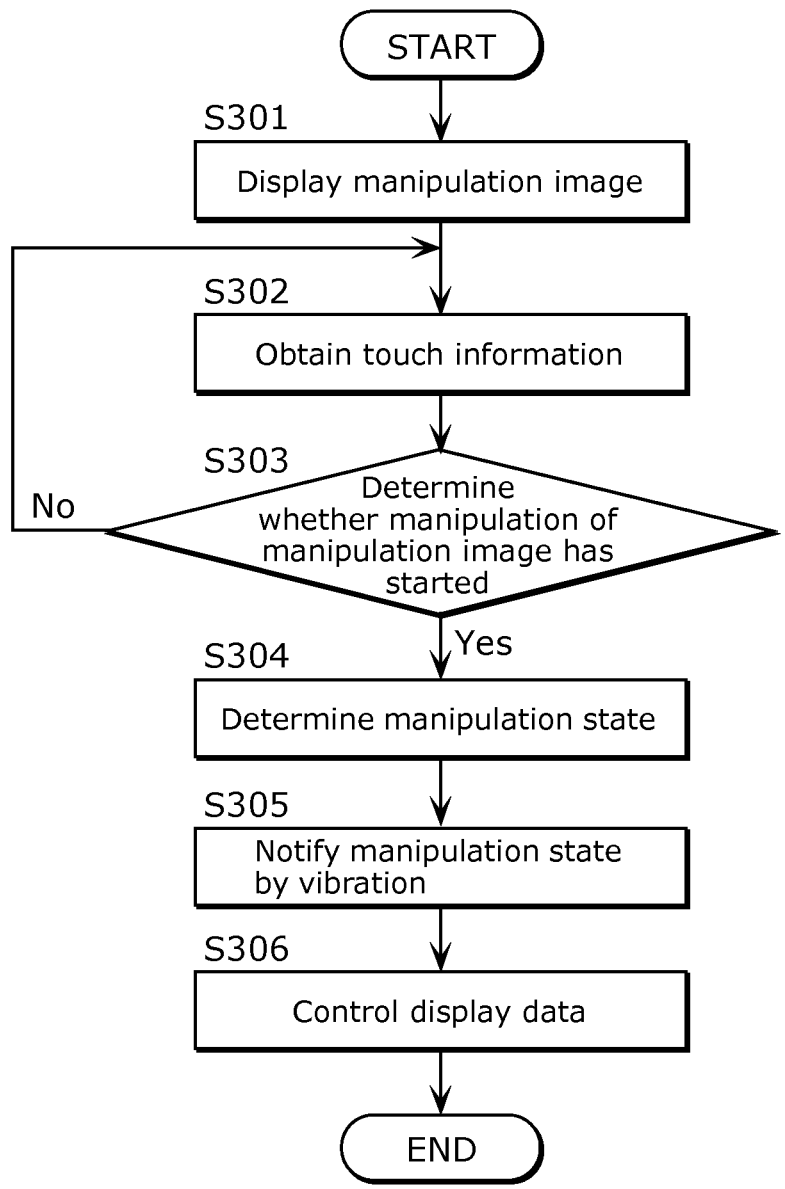
FIG. 3 is a flowchart which illustrates operation of the haptic feedback device according to Embodiment 1 of the present invention.

FIG. 3 is a flowchart illustrating operation of a manipulation sensation providing device according to the embodiment of the present invention, and a detailed description is given of the operation of the haptic feedback device according to Embodiment 1, based on this flowchart.

(Step S301: Display Manipulation Image)

The display control unit 106 displays the virtual trackball 3a on the display unit 103 as a manipulation image, by referring to display data stored in the first storage unit 104. The virtual trackball 3a may be displayed at a predetermined position on a GUI of an application to be operated. The virtual trackball 3a may be displayed on a GUI of an application to be operated at a position on the touch panel 101 at which the finger 1 keeps touching for a predetermined time period or a position on the touch panel 101 at which two or more fingers 1 keep touching. Alternatively, the virtual trackball 3a may not be displayed when there is no manipulation for a predetermined period.

(Step S302: Obtain Touch Information)

The determination unit 105 detects, using the touch panel 101, the touch position 2 at which the user makes a touch with his/her finger 1, and determines the manipulation state of the touch manipulation performed by the user. The touch position 2 is detected every time a predetermined sampling time Δt such as, for example, 20 ms elapses, and $P_t$ ($x_t$, $y_t$) which represents each touch position 2 is stored chronologically as a parameter for determining the manipulation state of the user. For example, a path touching velocity $v_t$ of the finger 1 at time t can be obtained by using Expression 2, with the use of the touch position $P_t$($x_t$, $y_t$) obtained at time t and the touch position $P_{t-1}$ ($x_{t-1}$, $y_{t-1}$) obtained at time (t−Δt).

[Math 2]

$$v_x = \frac{x_t - x_{t-1}}{\Delta t}$$
$$v_y = \frac{y_t - y_{t-1}}{\Delta t} \quad \text{Expression 2}$$
$$|v_t| = \sqrt{v_x^2 + v_y^2}$$

Here, $v_x$ is a velocity component in the x-axis direction at time t, whereas $v_y$ is a velocity component in the y-axis direction at time t. Further, |$v_t$| expresses the magnitude of the path touching velocity. Furthermore, a path length $d_t$ is obtained by using Expression 3, which indicates a path length along which the user touches the touch panel 101 with his/her finger 1 from a time at which the user starts making a touch along the touch panel 101 (t=0, path start position $P_0$ ($x_0$, $y_0$)) to time t (touch position $P_t$ ($x_t$, $y_t$)). When the finger 1 stops and hardly moves, the path start position $P_0$ ($x_0$, $y_0$) is replaced with $P_t$($x_t$, $y_t$) so as to be initialized. Here, "when the finger 1 stops and hardly moves" means that the touch position $P_t$ ($x_t$, $y_t$) obtained at time t is the same as the touch position ($x_{t-1}$, $y_{t-1}$) obtained at time (t−Δt), or a length between $P_t$ ($x_t$, $y_t$) and $P_{t-1}$ ($x_{t-1}$, $y_{t-1}$) is shorter than a predetermined length.

[Math 3]

$$d_t = \sum_{t=1}^{t} \sqrt{(x_t - x_{t-1})^2 + (y_t - y_{t-1})^2} \quad \text{Expression 3}$$

In step S302 as described above, plural touch positions $P_t$ ($x_t$, $y_t$) chronologically obtained, a path touching velocity $v_t$, and a path length $d_t$ calculated from the plural touch positions $P_t$ ($x_t$, $y_t$) are obtained, as touch information.

(Step S303: Determine Whether Manipulation of Manipulation Image has Started)

The determination unit 105 determines whether a touch position $P_t$ obtained at time t ($x_t$, $y_t$) is in the area where the virtual trackball 3a is displayed on the display surface of the display unit 103 which is the xy plane. The area where the virtual trackball 3a is displayed on the xy plane is represented by Expression 4 below. Therefore, the determination unit 105 determines that a touch position $P_t$ ($x_t$, $y_t$) obtained at time t which is distant from the sphere center 5 ($x_{sc}$, $y_{sc}$) on the xy plane by the radius r of the sphere or shorter, or in other words, a touch position $P_t(x_t, y_t)$ which satisfies Expressions 5 below is in the area where the virtual trackball 3a is displayed.

[Math 4]

$$(x-x^{sc})^2+(y-y^{sc})^2=r^2 \qquad \text{Expression 4}$$

[Math 5]

$$(x_t-x^{sc})^2+(y_t-y^{sc})^2 \leq r^2 \qquad \text{Expression 5}$$

If the determination unit 105 determines that a touch position $P_t(x_t, y_t)$ is in the area where the virtual trackball 3a is displayed, that touch position is stored as a path start position $P_0(x_0, y_0)$. When the touch position 2 at which the user performs a touch manipulation is no longer detected by the touch panel 101, the path start position $P_0(x_0, y_0)$ is abandoned. When a touch manipulation performed by the user is again detected by the touch panel 101 and furthermore, the touch position 2 is in the area where the virtual trackball 3a is displayed, the determination unit 105 newly stores the touch position of the touch manipulation detected again, as a path start position $P_0(x_0, y_0)$.

Specifically, here, if the determination unit 105 determines that a touch position is in the area where the virtual trackball 3a is displayed, the determination unit 105 determines that the user starts manipulating the virtual trackball 3a which is a manipulation image. When the determination unit 105 determines that the touch position $P_t(x_t, y_t)$ is not in the area where the virtual trackball 3a is displayed, or in other words, when the touch position $P_t(x_t, y_t)$ does not satisfy Expression 5, the processing returns to step S302.

(Step S304: Determine Manipulation State)

The determination unit 105 determines the manipulation state of a manipulation performed by the user, using a combination of states of a touch position $P_t$ at time t ($x_t, y_t$) and a touch position $P_{t-1}(x_{t-1}, y_{t-1})$ at time (t−Δt), the states each indicating one of "inside the area" where the virtual trackball 3a is displayed, "outside the area" where the virtual trackball 3a is displayed", and "not detected."

The determination unit 105 refers to stored information of touch positions obtained in step S302 to determine that, as a determination of the manipulation state, a touch position $P_t$ ($x_t, y_t$) that satisfies Expression 5 is "inside the area" where the virtual trackball 3a is displayed, whereas the touch position $P_t(x_t, y_t)$ that does not satisfy Expression 5 is "outside the area." Furthermore, "not detected" indicates a state where a touch manipulation performed by the user is not detected by the touch panel 101 at time t. Specifically, the determination unit 105 determines that the state is "not detected" if a touch manipulation performed by the user is not detected for a predetermined time.

FIG. 4 illustrates a relationship between the manipulation state determined by the determination unit 105 and the operations of the vibration control unit 107 and the display control unit 106.

The determination unit 105 determines which of manipulation states [1] to [9] illustrated in FIG. 4 is the manipulation state.

Manipulation state [1] is the first manipulation state in which the touch position 2 shifts within an area of the display unit 103 in which the virtual trackball 3a is displayed when the user shifts the touch position 2 by making a touch along the touch panel 101 with the finger 1 to rotate the virtual trackball 3a, and both the touch positions $P_{t-1}(x_{t-1}, y_{t-1})$ and $P_t(x_t, y_t)$ are "inside the area." This manipulation state corresponds to the first manipulation state in which, in the case of an actual trackball, the user rotates the ball with his/her finger on the ball.

Manipulation state [2] is the second manipulation state in which the touch position 2 shifts out of the area where the virtual trackball 3a is displayed, and a touch position $P_{t-1}$ ($x_{t-1}, y_{t-1}$) is "inside the area", whereas a touch position $P_t(x_t, y_t)$ is "outside the area". This manipulation state corresponds to the second manipulation state in which, in the case of an actual trackball, the user moves his/her finger 1 off the ball when rotating the ball with the finger, to let the ball keep rotating.

Manipulation state [3] is a manipulation state in which a touch position $P_{t-1}$ ($x_{t-1}, y_{t-1}$) is "inside the area", and a touch position $P_t$ ($x_t, y_t$) "is not detected", and the user moves his/her finger 1 off the touch panel 101 when rotating the trackball with the finger 1. This manipulation state is a state in which the user intentionally moves his/her finger 1 off the touch panel 101 in order to maintain the manipulation state of a manipulation on the virtual trackball 3a at time t−Δt, or a state in which the user unintentionally moves his/her finger 1 off the touch panel 101. Manipulation state [4] indicates the case where a touch position $P_{t-1}$ ($x_{t-1}, y_{t-1}$) is "outside the area", and a touch position $P_t$ ($x_t, y_t$) is "inside the area", and the user moves his/her finger 1 touching an area other than the area where the virtual trackball 3a is displayed into the area where the virtual trackball 3a is displayed. This manipulation state is a state where the user starts manipulating the virtual trackball 3a.

Manipulation states [5], [6], [8], and [9] all indicate the states in which the touch position 2 is not present in the area where the virtual trackball 3a is displayed, and the virtual trackball 3a is not manipulated. Manipulation state [7] indicates the case where a touch position $P_{t-1}$ ($x_{t-1}, y_{t-1}$) is "not detected", and a touch position $P_t$ ($x_t, y_t$) is "inside the area." This manipulation state is a state where the finger 1 is off the touch panel 101 at time t−Δt, and thereafter the area in which the virtual trackball is displayed is directly touched at time t, and a manipulation of starting a new manipulation on the virtual trackball 3a in the state at time t, or stopping the rotating virtual trackball 3a.

The determination unit 105 determines, from the above, which of manipulation states [1] to [9] matches the state.

(Step S305: Notify Manipulation State by Vibration)

The vibration control unit 107 controls vibration of the vibration unit 102 according to the manipulation state determined at step S304, which is illustrated in FIG. 4. If a piezoelectric element attached to the touch panel 101 is used as the vibration unit 102, the vibration control is to vibrate the touch panel 101 by applying a voltage to the piezoelectric element to cause the piezoelectric element to repeat expansion and contraction so that the element is displaced. Thus, the vibration control unit 107 controls a drive voltage applied to the piezoelectric element, thereby controlling vibration of the vibration unit 102, and vibrating the touch panel 101 at a desired frequency and amplitude.

Figure 5:
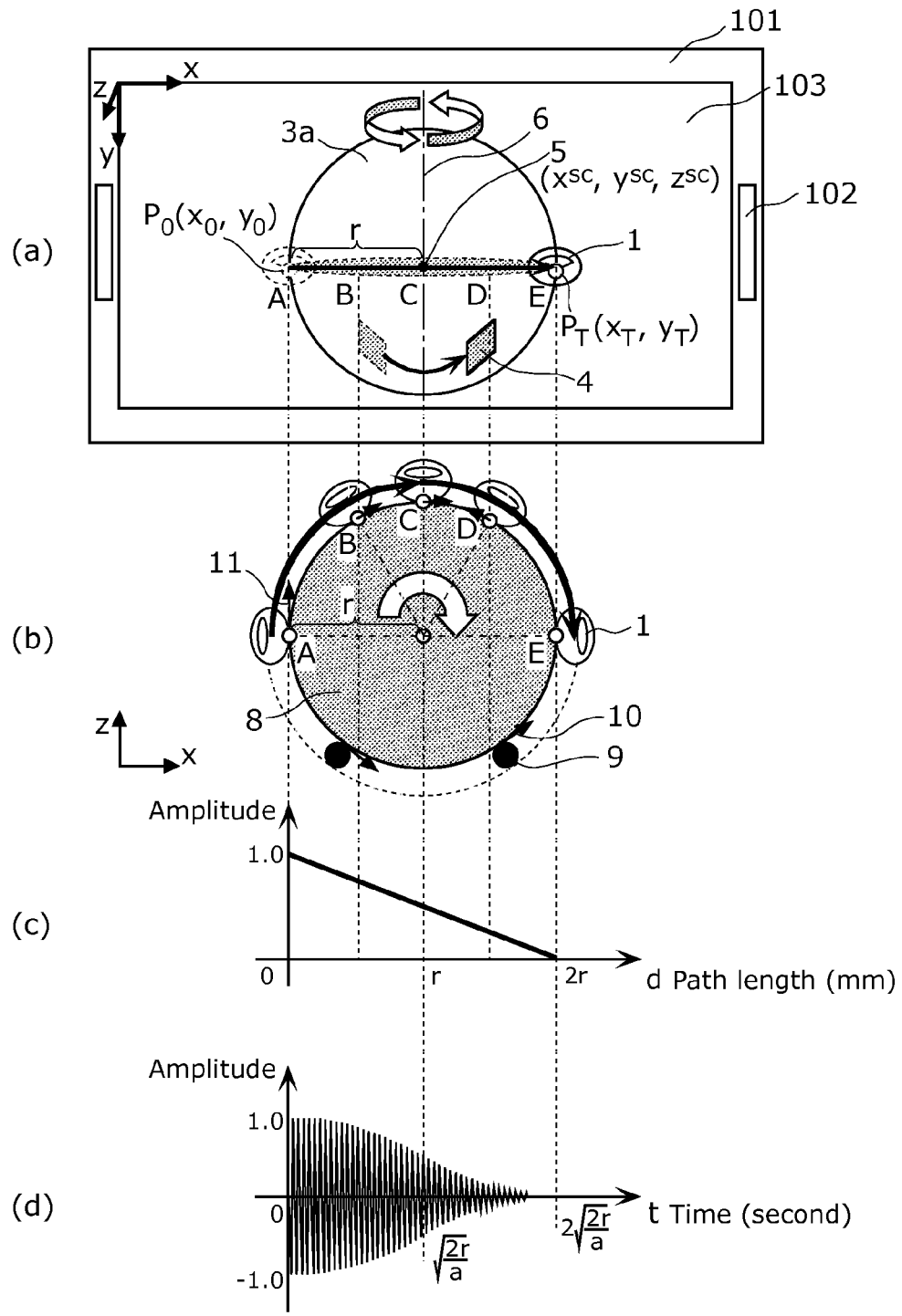
FIG. 5 illustrates an example of a drive waveform when a user manipulates the virtual trackball with his/her finger touching the trackball.

A description is given of the operation of the vibration control unit 107 when the state is determined to be manipulation state [1] in step S304, using FIG. 5. Part (a) of FIG. 5 illustrates an example in which the user rotates the virtual trackball 3a by the user moving his/her finger 1 to pass through the sphere center 5 (position C on the touch panel) and making a touch along the diameter of the sphere for the length thereof. The example shows the case where the user moves his/her finger 1 to make a touch along a path by passing through positions A, B C, D, and E in the state order. Position A indicates a path start position $P_0$ ($x_0, y_0$), and position E indicates a path end position $P_t(x_t, y_t)$. Position B is a position distant from position A by r/2, and position D is a position distant from position A by 3r/2. This path touching manipulation is a manipulation of rotating the virtual trackball 3a 180 degrees while the finger 1 is touching the surface of the virtual trackball 3a, without the finger 1 sliding over the virtual trackball 3a, as illustrated in (b) of FIG. 5. An example of a known structure of an actual trackball is to support a ball by a support ball having a smaller coefficient of friction, thereby allowing the ball to smoothly rotate with reduced resistance. When a manipulation sensation caused by rotating the virtual trackball 3a is to be conveyed to the user based on the above know structure by haptic feedback, a drive waveform (amplitude and frequency) is changed to intentionally vary the resistance while the finger 1 is making a touch along the surface of the display unit 103 in order that the user recognizes the manipulation state indicating that the virtual trackball 3a is rotating.

Conceivable virtual changes in the resistance during the rotation of the virtual trackball 3a include, as illustrated in (a) and (b) of FIG. 5, a change in virtual friction 10 between a virtual support ball 9 and the virtual trackball 3a and a change in the resistance in the portion about the rotation axis 6, and the like. Such virtual changes in the resistance vary a virtual tangential force 11 necessary for the user to rotate the virtual trackball 3a with the finger 1.

In Embodiment 1, when the finger 1 makes a touch along the touch panel 101, control is performed to decrease the amplitude of the drive waveform of the vibration unit 102 with an increase in the path length $d_t$ between when the rotation of the virtual trackball 3a starts and when the rotation stops, as illustrated in (c) of FIG. 5. Consequently, a change in resistance from when the rotation of the virtual trackball 3a starts through when the rotation stops is conveyed to the user.

In the example of a path touching manipulation, a virtual change in the resistance is shown using a modulated wave (reduction curve) whose amplitude decreases as the path length $d_t$ increases, and is zero at the point in time when the path length reaches a diameter of 2r. Specifically, a linear function as indicated by, for example, Expression 6 is used for this modulated wave as modulated wave $S_m(t)$. It should be noted that $d_t$ denotes a path length at time t, and r denotes a radius of the virtual trackball 3a. The path length d is obtained using Expression 3. Alternatively, an exponential function as indicated by Expression 7, for example, may be used as a modulated wave. Although a secondary function is used as an example in Expression 7, a constant of the exponentiation can be given in inverse proportion to the magnitude of resistance.

[Math 6]

$$S_m(t) = 1 - \frac{d_t}{2r} \quad \text{Expression 6}$$

[Math 7]

$$S_m(t) = \frac{1}{4r^2}(d_t - 2r)^2 \quad \text{Expression 7}$$

As the first drive waveform S (t) for driving the vibration unit 102, an amplitude modulation wave indicated by Expression 8 can be used, which is obtained by modulating the amplitude of the sine wave using the modulated wave indicated by Expression 6 based on the path length $d_t$ calculated by using Expression 3.

Part (d) of FIG. 5 is an example of the first drive waveform. This is a case where, assuming that a path start position on the touch panel 101 is position A and a path end position thereon is position E as illustrated in (a) of FIG. 5, the user makes a touch along the touch panel 101 as a path touching manipulation, by making linear motion with uniform acceleration, that is, acceleration a (a>0) from position A through position C and acceleration −a from position C through position E. The path length $d_t$ is shown by Expressions 9 and 10 below, a time for reaching position C from the path start position A is $(2r/a)^{1/2}$, and a time for reaching position E from the path start position A is $2(2r/a)^{1/2}$. A preferable frequency of a carrier wave ranges from 50 Hz to 500 Hz at which the user can feel a haptic sensation, and (d) of FIG. 5 illustrates an example of a drive waveform at the frequency of 100 Hz.

[Math 8]

$$S(t) = S_m(t)\sin(2\pi ft) \quad \text{Expression 8}$$

[Math 9]

$$d_t = \frac{1}{2}at^2 \left(0 \le t \le \sqrt{2r/a}\right) \quad \text{Expression 9}$$

[Math 10]

$$d_t = -\frac{a}{2}\left(t - 2\sqrt{2r/a}\right)^2 + 2r \left(\sqrt{2r/a} \le t \le 2\sqrt{2r/a}\right) \quad \text{Expression 10}$$

The vibration unit 102 is driven according to the first drive waveform, only when $|v_t|$ is positive as illustrated in FIG. 4. When $|v_t|=0$, the user is not moving his/her finger 1, which indicates the state where the virtual trackball 3a is not being rotated, and thus the amplitude of the drive waveform is set to zero. Practically, it is preferable to set the amplitude of the drive waveform to 0 if the value of $|v_t|$ is small enough, or in other words, the value is not strictly zero.

The vibration control unit 107 drives the vibration unit 102 according to the first drive waveform, thereby decreasing the amplitude as the path length increases. Thus, in a state where the user senses that the resistance decreases smoothly, the user can be provided with a sensation indicating that the virtual trackball 3a is being rotated with the finger 1 thereon.

The above-described first drive waveform is for conveying the manipulation state in which the resistance smoothly decreases by smoothly modulating the amplitude during a time $2(2r/a)^{1/2}$ used to reach position E from the path start position A when the virtual trackball 3a is rotated 180 degrees by the user touching along the path length corresponding to the diameter of the virtual trackball 3a. The method may be a method of providing the user with a manipulation sensation caused by rotating the virtual trackball 3a, by intentionally varying, while the user is performing a rotating manipulation, the amplitude of the drive waveform using FIG. 6 rather than the first above-mentioned drive waveform. The following describes this method. Parts (a) and (b) of FIG. 6 are the same as (a) and (b) of FIG. 5, respectively, and thus a description thereof is omitted.

Figure 6:
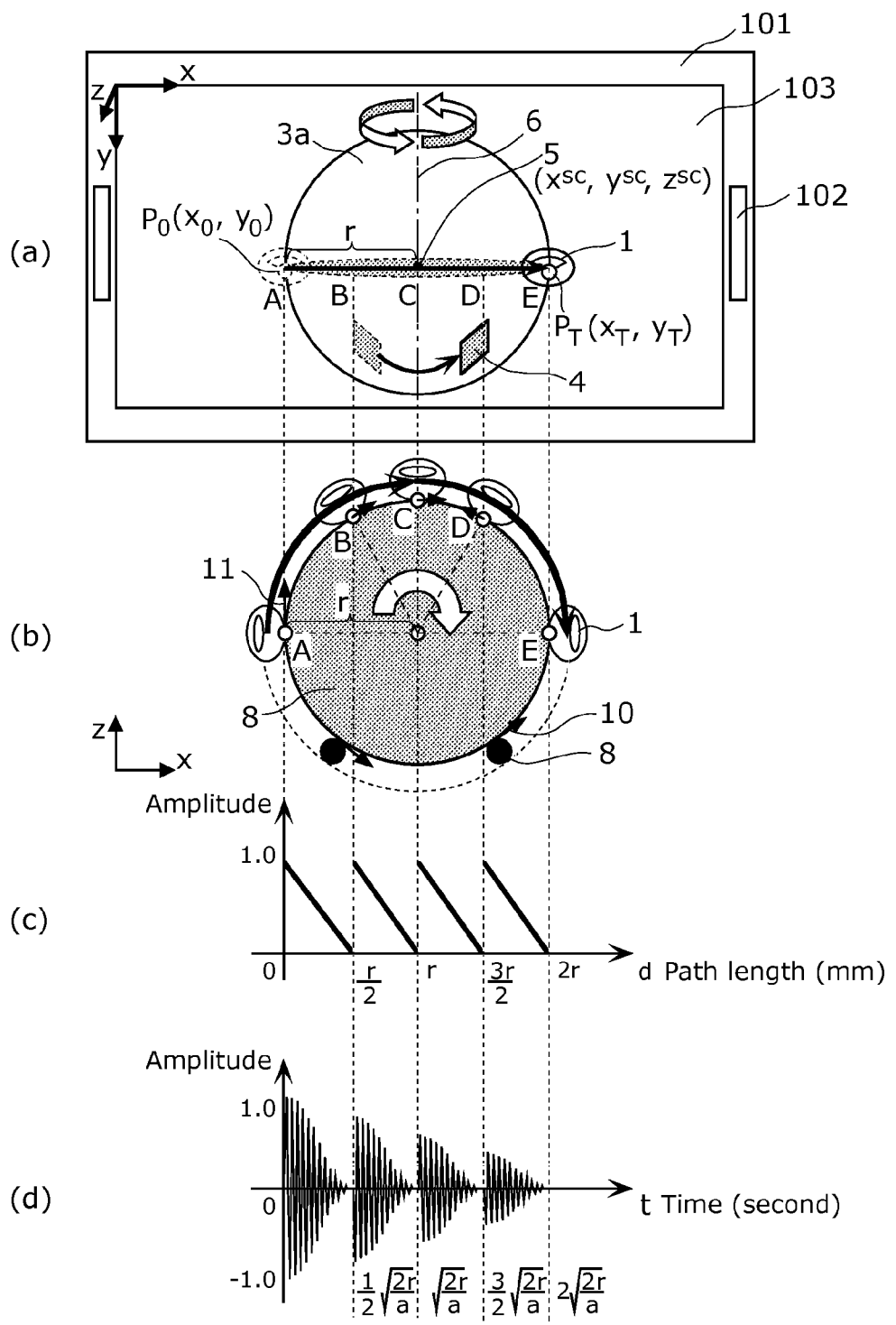
FIG. 6 illustrates another example of a drive waveform when the user manipulates the virtual trackball with his/her finger touching the trackball.

Part (c) of FIG. 6 presents the modulated wave in (c) of FIG. 5 in shorter cycle. Specifically, in (c) of FIG. 5, control is performed such that the amplitude of a drive waveform is zero at the path length 2r, whereas in (c) of FIG. 6, control is performed such that the amplitude of the drive waveform is initialized for each path length of r/2, and furthermore the amplitude at the beginning is decreased as the path length increases. It should be noted that "the amplitude of the drive waveform is initialized" here means that control is performed such that the amplitude of the drive waveform is decreased to zero for every r/2 which is a path length, and furthermore a new drive waveform is used for the control immediately after the path length reaches r/2. In other words, vibration control is repeatedly performed using a new drive waveform every time the path length reaches r/2. Specifically, in this case, the vibration control unit 107 performs vibration control of repeating driving the vibration unit 102 and stopping the drive thereof, using a drive waveform having a predetermined amplitude and a predetermined frequency from when the user starts a touch manipulation on the virtual trackball 3a at the touch start point through when the user ends the manipulation at the touch end point.

Part (d) of FIG. 6 illustrates a drive waveform obtained by modulating a 100-Hz sine wave using the modulated wave in (c) of FIG. 6. Accordingly, when rotating the virtual trackball 3a, the user senses a change in the resistance in short cycles, which provides the user with a manipulation sensation of not smoothly rotating the ball while the user is rotating the virtual trackball 3a.

In the case of (d) of FIG. 6, the user will sense four changes in the resistance. It is preferable to set cycles of the modulated wave such that the resistance changes one to five times while the user makes a touch along the diameter of the virtual trackball 3a. For example, if a virtual trackball having a diameter of about 50 mm is used, it is preferable to set the cycles of the modulated wave such that the resistance changes two to three times, in particular.

Here, although the initial amplitudes of all the modulated waves are the same, decreasing the amplitude with an increase in the path length can provide the user with a manipulation sensation, which facilitates the user to recognize the rotation.

Here, a preferable frequency of a carrier wave ranges from 50 Hz to 500 Hz at which the user can feel a haptic sensation. A preferable frequency of a carrier wave ranges from 90 Hz to 400 Hz for providing a manipulation sensation of rotating the sphere, in particular. Furthermore, a preferable frequency of a carrier wave ranges from 90 Hz to 180 Hz in order to provide the user with a manipulation sensation of smooth rotation, taking into consideration the smoothness of connections of repeated drive waveforms as illustrated in (d) of FIG. 6.

Figure 7:
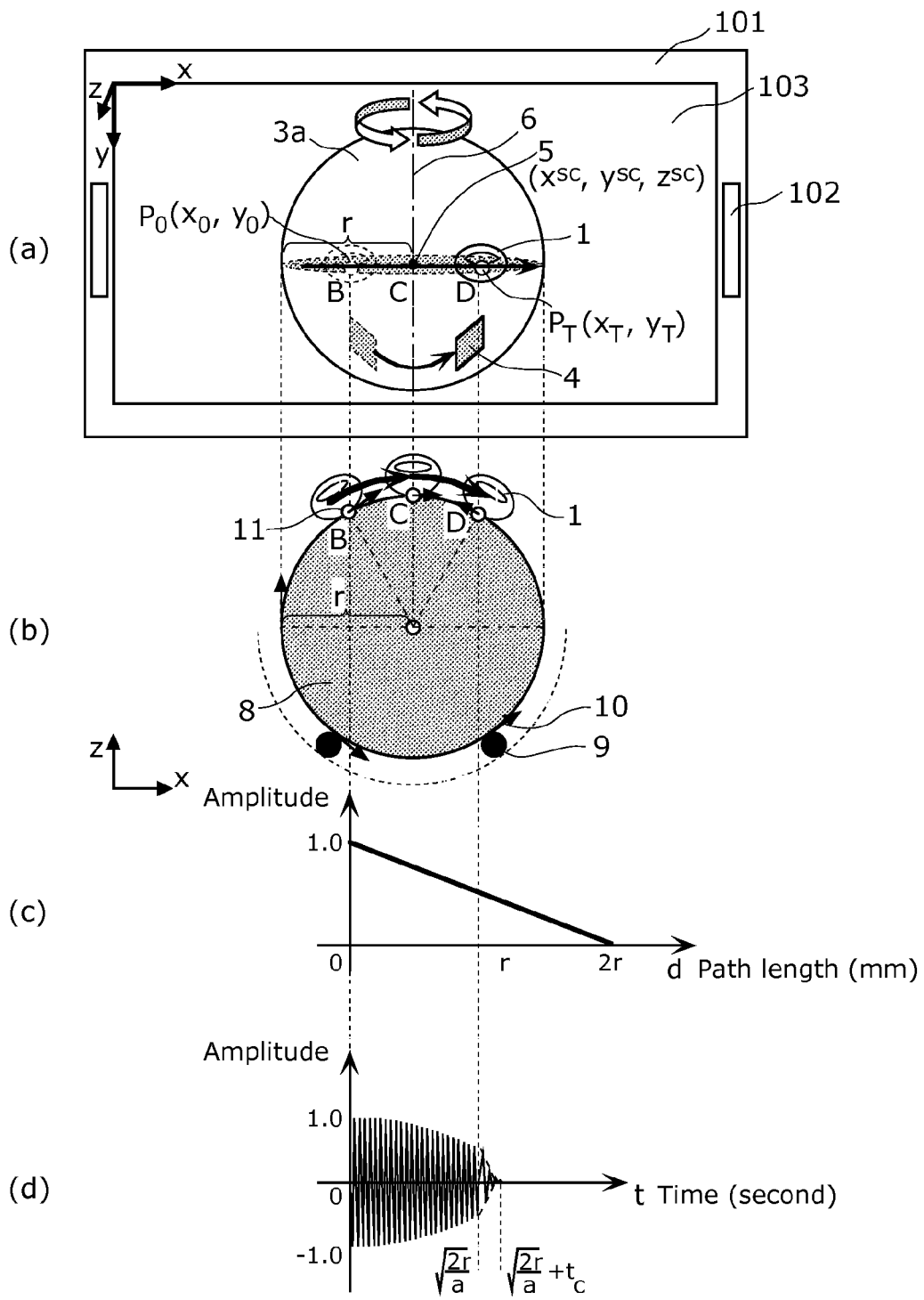
FIG. 7 illustrates an example of a drive waveform when the user stops making a path touching manipulation.

Parts (a) and (b) of FIG. 7 both illustrate an example in which the user moves his/her finger 1 to rotate the virtual trackball 3a from position B which is a path start position to position D which is a path end position. Also in the case of FIG. 7, it is determined in step S304 that the manipulation state of the touch manipulation performed by the user is manipulation state [1].

As illustrated in (c) of FIG. 7, the rotation is stopped when the user makes a touch along the path length r, as with the case of (c) of FIG. 5. Accordingly, if the user performs a path touching manipulation by moving his/her finger 1 from position B to position D, the amplitude of the drive waveform is not zero even immediately before the finger 1 stops. Thus, the amplitude of the drive waveform is decreased to zero after a predetermined period $t_c$ elapses from when the touch stops. Although the shorter $t_c$ is, the better it is, the time period may be about 5 ms. Regarding the drive waveform at this time, it is preferable to prevent generation of high frequency noise by smoothly decreasing the current amplitude value to the amplitude 0 as illustrated in (d) of FIG. 7.

If it is determined in step S304 that the manipulation state of the touch manipulation performed by the user is manipulation state [4], the user moves his/her finger from the outside of the area where the virtual trackball 3a is displayed to the inside of the area at $|v_r|>0$, and thus the vibration control unit 107 drives the vibration unit 102 according to the first drive waveform, as with manipulation state [1].

Figure 8:
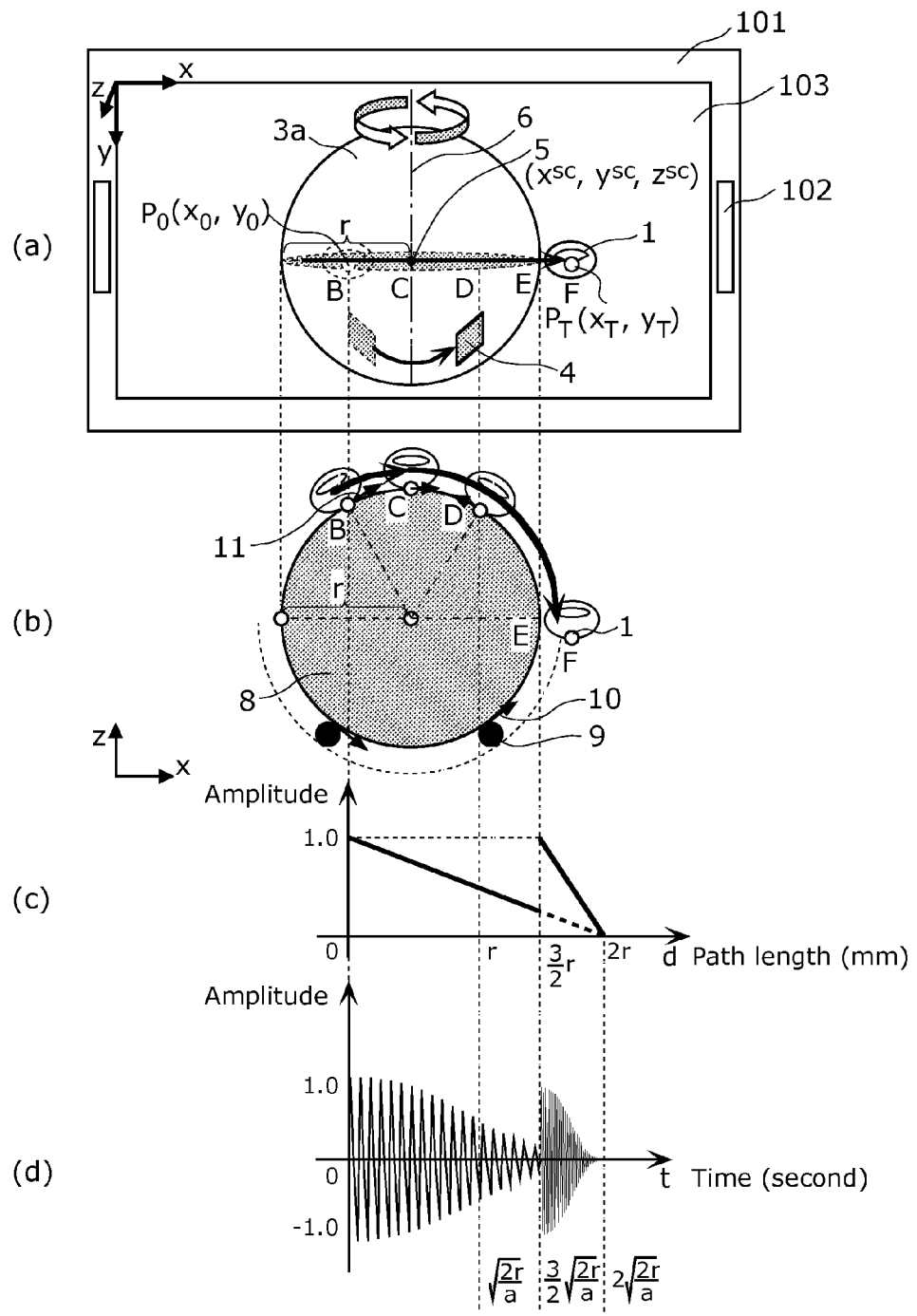
FIG. 8 illustrates an example of a drive waveform when the user performs a manipulation to let the virtual trackball keep rotating.

A description is given of the operation of the vibration control unit 107 performed when it is determined that the state is manipulation state [2], using FIG. 8. Parts (a) and (b) of FIG. 8 illustrate an example in which the user starts making a touch at position B which is a path start position, and passes position C to position E, and thereafter stops the path touching manipulation at position F which is outside the area where the virtual trackball 3a is displayed. Manipulation state [2] indicates a manipulation of letting the virtual trackball 3a keep rotating after the user moves his/her finger 1 off the touch panel 101 when the virtual trackball 3a is being rotated, which is different from a manipulation of rotating the virtual trackball 3a while the user keeps touching the ball with his/her finger 1. Thus, the vibration unit 102 is driven according to the second drive waveform different from the waveform in manipulation state [1].

Vibration is conveyed to the finger at the moment when the user moves his/her finger 1 off the ball in the case of manipulating an actual trackball. Specifically, immediately after it is determined in step S304 that the manipulation state of the touch manipulation performed by the user is manipulation state [2] illustrated in FIG. 4, the amplitude of the drive waveform which is decreased with an increase in the path length along which the user makes a touch inside the area where the virtual trackball 3a is displayed is set back to the amplitude at the time when the path touching manipulation starts as illustrated in (c) of FIG. 8. As illustrated in (d) of FIG. 8, the vibration unit 102 is driven according to a drive waveform obtained by changing the frequency of a carrier wave to a frequency different from that of the first drive waveform. A preferable different frequency ranges from 300 to 400 Hz, for example, which is higher than the frequency of the first drive waveform and also tactilely and acoustically different therefrom. It should be noted that after determining that the manipulation state of the touch manipulation performed by the user is manipulation state [2], it may be determined in step S304 that the state is manipulation state [7] in relation thereto. This is a manipulation of letting the virtual trackball 3a keep rotating even after the user moves his/her finger 1 off in manipulation state [2], and thus in manipulation state [7] determined after that, the finger 1 is off the touch panel 101 at time t−Δt, and thereafter the user directly touches the area where the virtual trackball is displayed with his/her finger at time t. Specifically, the manipulation performed in this case is to newly start a manipulation of rotating the virtual trackball 3a in the state at time t or to stop the rotating virtual trackball 3a in the state at time t.

It should be noted that if the manipulation state of the touch manipulation performed by the user is determined in step S304 to be manipulation state [7] illustrated in FIG. 4 and the virtual trackball 3a is rotating, the vibration unit 102 is driven according to a third drive waveform in order to convey a manipulation sensation at the time of stopping the rotation of the virtual trackball 3a. Burst driving may be performed, which is, for instance, to cause the vibration unit 102 to vibrate for about 20 ms according to the third drive waveform for which a sine wave at the same frequency as the second drive waveform is used and which has an amplitude decreased to such an extent that the third drive waveform can be distinguished from the second drive waveform.

If the manipulation state of a touch manipulation performed by the user is determined in step S304 to be one of manipulation states [3], [5], [6], [8], and [9] illustrated in FIG. 4, the touch position 2 is not present at time t in the area where the virtual trackball 3a is displayed. Thus, it is determined that the user is not manipulating the virtual trackball 3*a*, and consequently the vibration control unit 107 does not drive the vibration unit 102.

As described above, the vibration control unit 107 drives the vibration unit 102 using the first drive waveform or the second drive waveform in the manipulation state [1] or [2] respectively, which allows the user to recognize, by a manipulation sensation through haptic feedback, whether the state is a state where the user is rotating the virtual trackball 3*a* with his/her finger 1 thereon or a manipulation of moving his/her finger 1 off the ball to let the ball keep rotating when the ball is being rotated is accepted. Furthermore, a manipulation sensation caused when the user stops the rotating virtual trackball 3*a* can be conveyed if necessary.

(Step S306: Control Display Data)

The display control unit 106 controls display data displayed on the display unit 103, based on the manipulation state determined in step S304, which is one of the states illustrated in FIG. 4.

If it is determined in step S304 that the manipulation state of a touch manipulation performed by the user is manipulation state [1] or [4], the virtual trackball 3*a* is rotated by the rotation angle $7\Delta\theta = \theta_t - \theta$, as illustrated in FIG. 2 about the rotation axis 6 which is a straight line passing through the sphere center 5 and perpendicular to the rotational plane 8 at which the manipulation image 3 crosses a plane perpendicular to the xy plane and including two touch positions 2, namely, a touch position $P_t$ ($x_t$, $y_t$) obtained at time t and a touch position $P_{t-1}$ ($x_{t-1}$, $y_{t-1}$) obtained at time (t−Δt).

The display control unit 106 keeps rotating the virtual trackball 3*a* at the velocity $|v_t|$ in the tangential direction at time t if it is determined in step S304 that the manipulation state of a touch manipulation performed by the user is manipulation state [2]. It should be noted that the display control unit 106 may stop this rotation if it is determined in step S304 that the state of the touch manipulation performed by the user is manipulation state [7], or alternatively, may stop the rotation by decreasing the rotational velocity as a certain time period elapses.

Furthermore, if it is determined in step S304 that the manipulation state of the touch manipulation performed by the user is manipulation state [3], the display control unit 106 keeps rotating the virtual trackball 3*a* at the velocity in the tangential direction at time t−Δt, similarly.

Furthermore, if it is determined in step S304 that the manipulation state of the touch manipulation performed by the user is manipulation state [5], [6], [8], or [9], the display control unit 106 determines that the user is not manipulating the virtual trackball 3*a*, since the touch position 2 is not present at time t in the area where the virtual trackball 3*a* is displayed. Accordingly, the display control unit 106 does not make a change for rotating the virtual trackball 3*a*.

According to the above-described configuration and manipulation, when the user makes a touch along the touch panel 101 with his/her finger 1 to rotate the virtual trackball 3*a* displayed on the display unit 103 by moving the touch position 2, the determination unit 105 determines whether the state is the first manipulation state in which the touch position 2 is changed within the area where the virtual trackball 3*a* is displayed or the second manipulation state in which the user moves his/her finger 1 off the touch panel 101 to let the virtual trackball 3*a* keep rotating when the virtual trackball 3*a* is being rotated. Then, the vibration control unit 107 causes the vibration unit 102 to vibrate at a different drive waveform according to the first manipulation state or the second manipulation state.

As a result, the user can recognize, by a manipulation sensation through haptic feed back, whether the state is a state of rotating the virtual trackball 3*a* with his/her finger 1 thereon or a manipulation of moving his/her finger 1 off the ball to let the ball keep rotating when the ball is being rotated is accepted.

It should be noted that in the above embodiments, each of the constituent elements may be constituted by dedicated hardware, or may be obtained by executing a software program suitable for the constituent element. Each constituent element may be obtained by a program execution unit such as a CPU or a processor reading and executing a software program stored in a recording medium such as a hard disk or semiconductor memory. Here, software which achieves the haptic feedback device according to the above embodiments is a program as follows.

Specifically, this program causes a computer to execute a method, which is described below, for driving a haptic feedback device for informing, when a user performs a touch manipulation on a three-dimensional model of a manipulation image displayed on a display unit, the user of a manipulation state of the touch manipulation. The haptic feedback device includes: a touch panel which receives a touch manipulation performed by the user at a corresponding position on a display surface of the display unit, and detects, as a touch position, the corresponding position at which the touch manipulation is received; a vibration unit configured to vibrate the touch panel; the display unit; and a first storage unit configured to store display data indicating the manipulation image. The method for driving the haptic feedback device, includes: (a) (i) obtaining a plurality of the touch positions detected by the touch panel at different times, and (ii) determining the manipulation state, based on the plurality of obtained touch positions; (b) (i) displaying the manipulation image on the display unit, and (ii) making or not making a change for rotating the manipulation image displayed on the display unit, depending on the manipulation state determined in step (a); and (c) causing the vibration unit to vibrate based on the manipulation state determined in step (a), wherein in step (a), (i) the manipulation state of a touch manipulation is determined to be a first manipulation state when a touch position detected by the touch panel during the touch manipulation on the manipulation image shifts within an area of the display unit in which the manipulation image is displayed, and (ii) the manipulation state of a touch manipulation is determined to be a second manipulation state when a touch position detected by the touch panel during the touch manipulation on the manipulation image shifts out of the area of the display unit in which the manipulation image is displayed, in step (c), when it is determined in step (a) that the manipulation state is the first manipulation state, an amplitude of a first drive waveform for vibrating the vibration unit is decreased with an increase in a length of a shift of the touch position, which corresponds to the change from a start to a stop, and control is performed to cause the vibration unit to vibrate according to the first drive waveform the amplitude of which is decreased to zero in a predetermined time after the change stops, and when it is determined in step (a) that the manipulation state is the second manipulation state, the vibration unit is caused to vibrate according to a second drive waveform after the touch position has shifted out of the area in which the manipulation image is displayed, and in step (b), when it is determined in step (a) that the manipulation state is the first manipulation state, the change is made to the manipulation image displayed on the display unit, based on a difference between two of the plurality of touch positions, and when it is determined in step (a) that the manipulation state is the second manipulation state, the change is made to the manipulation image displayed on the display unit, based on a velocity calculated from the plurality of touch positions obtained along the shift from inside to outside of the area in which the manipulation image is displayed.

It should be noted that although the above is a description of the present invention, based on the above-described embodiment, the present invention is of course not limited to the above-described embodiment. The following is also included in the present invention.

(1) Specifically, each device described above may be achieved by a computer system which includes a microprocessor, a ROM, a RAM, a hard disk unit, a display unit, a keyboard, a mouse, and the like. A computer program is stored in the RAM or the hard disk unit. The operation of the microprocessor in accordance with the computer program allows each device to achieve its functionality. Here, the computer program includes a combination of instruction codes indicating instructions to a computer in order to achieve a given functionality.

(2) Some or all of constituent elements included in each device described above may include a single system large scale integration (LSI: large scale integrated circuit). The system LSI is a super multi-function LSI manufactured by integrating multiple components into one chip, and is specifically a computer system configured so as to include a microprocessor, a ROM, a RAM, and so on. A computer program is stored in the RAM. The system LSI accomplishes its functions through the load of the computer program from the ROM to the RAM by the microprocessor and the operation of the microprocessor in accordance with the computer program.

(3) Some or all of constituent elements included in each device described above may include an IC card or a single module which can be attached to or detached from the device. The IC card or the module is a computer system which includes a microprocessor, a ROM, a RAM, and the like. The above super-multifunctional LSI may be included in the IC card or the module. The IC card or the module accomplishes its functions through the operation of the microprocessor in accordance with the computer program. This IC card or module may have tamper resistant properties.

(4) The present invention may be achieved by the methods described above. In addition, these methods may be achieved by a computer program implemented by a computer, or may be implemented by a digital signal which includes a computer program.

The present invention may be achieved by a computer program or a digital signal stored in a computer-readable recording medium such as, for example, a flexible disk, a hard disk, CD-ROM, MO, DVD, DVD-ROM, DVD-RAM, a blue-ray disc (BD), or a semiconductor memory. Alternatively, the present invention may be achieved by a digital signal stored in such a recording medium.

With the present invention, the computer program or the digital signal may be transmitted via, for instance, data broadcasting or a network typified by electric telecommunication lines, wireless or wired communication lines, and the Internet.

The present invention may be a computer system which includes a microprocessor and a memory, the memory may have stored therein a computer program, and the microprocessor may operate in accordance with the computer program.

Another independent computer system may implement a program or a digital signal transported being stored in a recording medium, or a program or a digital signal transported via a network or the like.

(5) The above embodiment and the above variation may be combined.

Although the above is a description of the haptic feedback device according to one or more aspects of the present invention, based on the embodiments, the present invention is not limited to the embodiments. Various modifications to the embodiments that may be conceived by those skilled in the art and combinations of constituent elements in different embodiments may be included within the scope of one or more aspects of the present invention, without departing from the spirit of the present invention.

INDUSTRIAL APPLICABILITY

A haptic feedback device according to the present invention can provide a user with a manipulation sensation caused when the user rotates a spherical virtual object by touching a touch panel, and thus is applicable to manipulation of a device which includes a touch panel. For example, the haptic feedback device is applicable to manipulation interfaces such as a tablet terminal, a game machine, a TV remote control, a digital camera, a movie camera, a personal computer, a personal digital assistant, a mobile phone, an electronic blackboard, and the display for digital signage, which are manipulated using a touch panel.

REFERENCE SIGNS LIST

1 Finger
2 Touch position
3 Manipulation image
3a Virtual trackball
4 Texture information
5 Sphere center
6 Rotation axis
101 Touch panel
102 Vibration unit
103 Display unit
104 First storage unit
105 Determination unit
106 Display control unit
107 Vibration control unit

The invention claimed is:

1. A haptic feedback device for informing, when a user performs a touch manipulation on a three-dimensional model of a manipulation image displayed on a display unit, the user of a manipulation state of the touch manipulation, the haptic feedback device comprising:
   a touch panel which receives a touch manipulation performed by the user at a corresponding position on a display surface of the display unit, and detects, as a touch position, the corresponding position at which the touch manipulation is received;
   a vibration unit configured to vibrate the touch panel;
   the display unit;
   a determination unit configured to calculate a path length along which the user touches the touch panel, based on a plurality of the touch positions detected by the touch panel;
   a display control unit configured to (i) display the manipulation image on the display unit, and (ii) convert the path length into a rotation angle at which the manipulation image is to be rotated about a predetermined reference point, and display, on the display unit, the manipulation image rotated by the rotation angle converted from the path length; and a vibration control unit configured to (i) drive, upon starting rotation of the manipulation image, the vibration unit according to a drive waveform having a predetermined amplitude and a predetermined frequency, (ii) decrease the amplitude of the drive waveform with an increase in the path length, and (iii) perform control to cause the vibration unit to vibrate according to the drive waveform the amplitude of which is decreased to zero in a predetermined time after the rotation of the manipulation image stops.

2. A method for driving a haptic feedback device for informing, when a user performs a touch manipulation on a three-dimensional model of a manipulation image displayed on a display unit, the user of a manipulation state of the touch manipulation, the haptic feedback device including:

a touch panel which receives a touch manipulation performed by the user at a corresponding position on a display surface of the display unit, and detects, as a touch position, the corresponding position at which the touch manipulation is received;

a vibration unit configured to vibrate the touch panel; the display unit; and a first storage unit configured to store display data indicating the manipulation image, the method for driving the haptic feedback device, comprising:

(a) (i) obtaining a plurality of the touch positions detected by the touch panel at different times, and (ii) determining the manipulation state, based on the plurality of obtained touch positions;

(b) (i) displaying the manipulation image on the display unit, and (ii) making or not making a change for rotating the manipulation image displayed on the display unit, depending on the manipulation state determined in step (a); and (c) causing the vibration unit to vibrate based on the manipulation state determined in step (a), wherein in step (a), (i) the manipulation state of a touch manipulation is determined to be a first manipulation state when a touch position detected by the touch panel during the touch manipulation on the manipulation image shifts within an area of the display unit in which the manipulation image is displayed, and (ii) the manipulation state of a touch manipulation is determined to be a second manipulation state when a touch position detected by the touch panel during the touch manipulation on the manipulation image shifts out of the area of the display unit in which the manipulation image is displayed, in step (c), when it is determined in step (a) that the manipulation state is the first manipulation state, an amplitude of a first drive waveform for vibrating the vibration unit is decreased with an increase in a length of a shift of the touch position, which corresponds to the change from a start to a stop, and control is performed to cause the vibration unit to vibrate according to the first drive waveform the amplitude of which is decreased to zero in a predetermined time after the change stops, and when it is determined in step (a) that the manipulation state is the second manipulation state, the vibration unit is caused to vibrate according to a second drive waveform after the touch position has shifted out of the area in which the manipulation image is displayed, and in step (b), when it is determined in step (a) that the manipulation state is the first manipulation state, the change is made to the manipulation image displayed on the display unit, based on a difference between two of the plurality of touch positions, and when it is determined in step (a) that the manipulation state is the second manipulation state, the change is made to the manipulation image displayed on the display unit, based on a velocity calculated from the plurality of touch positions obtained along the shift from inside to outside of the area in which the manipulation image is displayed.

3. A non-transitory computer-readable recording medium having stored therein a haptic feedback device drive program for causing a computer to execute the method according to claim 2.

4. A haptic feedback device for informing, when a user performs a touch manipulation on a three-dimensional model of a manipulation image displayed on a display unit, the user of a manipulation state of the touch manipulation, the haptic feedback device comprising:

a touch panel which receives a touch manipulation performed by the user at a corresponding position on a display surface of the display unit, and detects, as a touch position, the corresponding position at which the touch manipulation is received;

a vibration unit configured to vibrate the touch panel; the display unit;

a first storage unit configured to store display data indicating the manipulation image;

a determination unit configured to (i) obtain a plurality of the touch positions detected by the touch panel at different times, and (ii) determine the manipulation state, based on the plurality of obtained touch positions;

a display control unit configured (i) to display the manipulation image on the display unit, and (ii) to make or not to make a change for rotating the manipulation image displayed on the display unit, depending on the manipulation state determined by the determination unit; and a vibration control unit configured to cause the vibration unit to vibrate based on the manipulation state determined by the determination unit, wherein the determination unit is configured to (i) determine that the manipulation state of a touch manipulation is a first manipulation state when a touch position detected by the touch panel during the touch manipulation on the manipulation image shifts within an area of the display unit in which the manipulation image is displayed, and (ii) determine that the manipulation state of a touch manipulation is a second manipulation state when a touch position detected by the touch panel during the touch manipulation on the manipulation image shifts out of the area of the display unit in which the manipulation image is displayed, when the determination unit determines that the manipulation state is the first manipulation state, the vibration control unit is configured to decrease an amplitude of a first drive waveform for vibrating the vibration unit with an increase in a length of a shift of the touch position, which corresponds to the change from a start to a stop, and perform control to cause the vibration unit to vibrate according to the first drive waveform the amplitude of which is decreased to zero in a predetermined time after the change stops, and when the determination unit determines that the manipulation state is the second manipulation state, the vibration control unit is configured to cause the vibration unit to vibrate according to a second drive waveform after the touch position has shifted out of the area in which the manipulation image is displayed, and when the determination unit determines that the manipulation state is the first manipulation state, the display control unit is configured to make the change to the manipulation image displayed on the display unit, based on a difference between two of the plurality of touch positions, and when the determination unit determines that the manipulation state is the second manipulation state, the display control unit is configured to make the change to the manipulation image displayed on the display unit, based on a velocity calculated from the plurality of touch positions obtained along the shift from inside to outside of the area in which the manipulation image is displayed.

5. A haptic feedback device for informing, when a user performs a touch manipulation on a three-dimensional model of a manipulation image displayed on a display unit, the user of a manipulation state of the touch manipulation, the haptic feedback device comprising:
- a touch panel which receives a touch manipulation performed by the user at a corresponding position on a display surface of the display unit, and detects, as a touch position, the corresponding position at which the touch manipulation is received;
- a vibration unit configured to vibrate the touch panel;
- the display unit;
- a determination unit configured to (i) determine that the manipulation state of a touch manipulation is a first manipulation state when a touch position detected by the touch panel during the touch manipulation on the manipulation image shifts within an area of the display unit in which the manipulation image is displayed, and (ii) determine that the manipulation state of a touch manipulation is a second manipulation state when a touch position detected by the touch panel during the touch manipulation on the manipulation image shifts out of the area of the display unit in which the manipulation image is displayed;
- a display control unit configured to (i) display the manipulation image to be manipulated by the touch manipulation, on part of the display unit, and (ii) rotate the manipulation image, based on a length between two of a plurality of the touch positions and a direction defined by the two touch positions, and display the rotated manipulation image; and
- a vibration control unit configured to control vibration of the vibration unit to vibrate the touch panel according to drive waveforms having different amplitudes and different frequencies, according to the first manipulation state and the second manipulation state.

6. The haptic feedback device according to claim 5,
wherein when the determination unit determines that the manipulation state is the first manipulation state, the vibration control unit is configured to decrease an amplitude of a first drive waveform for vibrating the vibration unit with an increase in a length of a shift in the touch position detected during the touch manipulation the manipulation state of which is determined to be the first manipulation state, and perform control to cause the vibration unit to vibrate according to the first drive waveform the amplitude of which is decreased to zero at a position where the touch manipulation ends, and when the determination unit determines that the manipulation state is the second manipulation state, the vibration control unit is configured to cause the vibration unit to vibrate according to a second drive waveform after the touch position has shifted out of the area in which the manipulation image is displayed, and when the determination unit determines that the manipulation state is the first manipulation state, the display control unit is configured to make the change to the manipulation image displayed on the display unit, based on a difference between two of the plurality of touch positions, and when the determination unit determines that the manipulation state is the second manipulation state, the display control unit is configured to make the change to the manipulation image displayed on the display unit, based on a velocity calculated from the plurality of touch positions obtained along the shift from inside to outside of the area in which the manipulation image is displayed.

7. A haptic feedback device for informing, when a user performs a touch manipulation on a three-dimensional model of a manipulation image displayed on a display unit, the user of a manipulation state of the touch manipulation, the haptic feedback device comprising:
- a touch panel which receives a touch manipulation performed by the user at a corresponding position on a display surface of the display unit, and detects, as a touch position, the corresponding position at which the touch manipulation is received;
- the display unit;
- a display control unit configured to (i) display the manipulation image on the display unit, and (ii) display the manipulation image rotated based on a length between two of a plurality of the touch positions detected by the touch panel and a direction defined by the two touch positions;
- a vibration unit configured to vibrate the touch panel;
- a determination unit configured to calculate a path length along which the user touches the touch-panel, based on chronological information of the plurality of touch positions; and
- a vibration control unit configured to (i) drive the vibration unit according to a drive waveform having a predetermined amplitude and a predetermined frequency at a touch start point in the touch manipulation on the manipulation image, (ii) decrease the amplitude of the drive waveform with an increase in the path length, and (iii) perform control to cause the vibration unit to vibrate according to the drive waveform the amplitude of which is decreased to zero when a predetermined time elapses after the user touches a touch end point of the plurality of touch positions at which the touch manipulation is performed on the manipulation image.

8. A haptic feedback device for informing, when a user performs a touch manipulation on a three-dimensional model of a manipulation image displayed on a display unit, the user of a manipulation state of the touch manipulation, the haptic feedback device comprising:
- a touch panel which receives a touch manipulation performed by the user at a corresponding position on a display surface of the display unit, and detects, as a touch position, the corresponding position at which the touch manipulation is received;
- the display unit;
- a display control unit configured to (i) display the manipulation image on the display unit, and (ii) display the manipulation image rotated based on a length between two of a plurality of the touch positions and a direction defined by the two touch positions;
- a vibration unit configured to vibrate the touch panel;

a determination unit configured to calculate a path length along which the user touches the touch-panel, based on chronological information of the plurality of touch positions; and a vibration control unit configured to perform vibration control to repeatedly drive the vibration unit according to a drive waveform having a predetermined amplitude and a predetermined frequency and stop driving the vibration unit, from when the user starts the touch manipulation on the manipulation image at a touch start point through when the user ends the touch manipulation at a touch end point.

* * * * *